(12) United States Patent
Fukuchi et al.

(10) Patent No.: US 7,845,919 B2
(45) Date of Patent: Dec. 7, 2010

(54) BRAKE RELEASING MECHANISM AND BRAKE SYSTEM

(75) Inventors: Eiji Fukuchi, Kyoto (JP); Hisatoshi Sakurai, Kyoto (JP)

(73) Assignee: Eaton Corporation, Cleveland, OH (US)

( * ) Notice: Subject to any disclaimer, the term of this patent is extended or adjusted under 35 U.S.C. 154(b) by 557 days.

(21) Appl. No.: 11/694,591

(22) Filed: Mar. 30, 2007

(65) Prior Publication Data
US 2008/0240959 A1 Oct. 2, 2008

(51) Int. Cl.
*F01C 1/02* (2006.01)
(52) U.S. Cl. ...................................... 418/61.3
(58) Field of Classification Search ............... 418/61.3, 418/181
See application file for complete search history.

(56) References Cited

U.S. PATENT DOCUMENTS

| | | | |
|---|---|---|---|
| 4,343,601 A | 8/1982 | Thorson | |
| 4,645,438 A | 2/1987 | Dahlquist | |
| 5,114,324 A * | 5/1992 | Spindeldreher | 418/61.3 |
| 5,531,071 A * | 7/1996 | Asano | 60/441 |
| 6,030,194 A | 2/2000 | Yakimow et al. | |
| 6,033,195 A | 3/2000 | Uppal | |
| 6,062,835 A | 5/2000 | Acharya et al. | |
| 6,068,460 A | 5/2000 | Haarstad et al. | |
| 6,132,194 A | 10/2000 | Wenker et al. | |
| 6,345,968 B1 | 2/2002 | Shupe | |
| 6,811,509 B1 | 11/2004 | Langenfeld et al. | |
| 6,826,909 B2 | 12/2004 | Walls | |
| 6,932,587 B2 | 8/2005 | Dong | |

FOREIGN PATENT DOCUMENTS

| | | |
|---|---|---|
| EP | 1443212 | 8/2004 |
| JP | 07004340 A2 | 1/1995 |
| JP | 2002021702 A2 | 1/2002 |

OTHER PUBLICATIONS

International Search Report for PCT/IB2007/051887, Mar. 12, 2007.

* cited by examiner

*Primary Examiner*—Thomas E Denion
*Assistant Examiner*—Mary A Davis
(74) *Attorney, Agent, or Firm*—Rader, Fishman & Grauer PLLC

(57) ABSTRACT

An embodiment of a gerotor apparatus includes a housing including a first member. The first member includes a brake pin aperture formed therein. The apparatus also includes a brake pin at least partially interposed within the first member. The brake pin includes a first annular surface and a second annular surface. The first annular surface defines, at least in part, a first brake chamber. The second annular surface defines, at least in part, a second brake chamber. A first fluid introduced into the first brake chamber will urge the brake pin in a first direction. A second fluid introduced into the second brake chamber will urge the brake pin generally in the first direction.

16 Claims, 5 Drawing Sheets

US 7,845,919 B2

BRAKE RELEASING MECHANISM AND BRAKE SYSTEM

TECHNICAL FIELD

The disclosure generally relates to rotary fluid pressure devices, and more particularly, to such devices of the type including a fluid displacement mechanism which comprises a gerotor pair.

BACKGROUND

Braking and lock mechanisms for many gerotor motors and pumps are typically provided to prevent rotation of hydraulic torque transmissions systems when not in use.

In some vehicle applications for low-speed, high-torque gerotor motors, it is desirable for the motor to have some sort of parking brake or parking lock, the term "lock" being preferred because it is intended that the parking lock be engaged only after the vehicle is stopped. In other words, such parking lock devices are not intended to be dynamic brakes, which would be engaged while the vehicle is moving, to bring the vehicle to a stop.

Many brake and lock mechanisms for motors in general, and especially for hydraulic gerotor set motors, use a piston that is actuated by the hydraulic inlet pressure to disengage the brake/lock mechanism. However, the supply pressure for these pistons may not have a constant supply of pressurized fluid to ensure that the mechanism remains desirably disengaged.

SUMMARY

An illustrative embodiment of a gerotor apparatus includes a housing including a first member. The first member includes a brake pin aperture formed therein. The apparatus also includes a brake pin at least partially interposed within the first member. The brake pin includes a first annular surface and a second annular surface. The first annular surface defines, at least in part, a first brake chamber. The second annular surface defines, at least in part, a second brake chamber. A first fluid introduced into the first brake chamber will urge the brake pin in a first direction. A second fluid introduced into the second brake chamber will urge the brake pin generally in the first direction.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
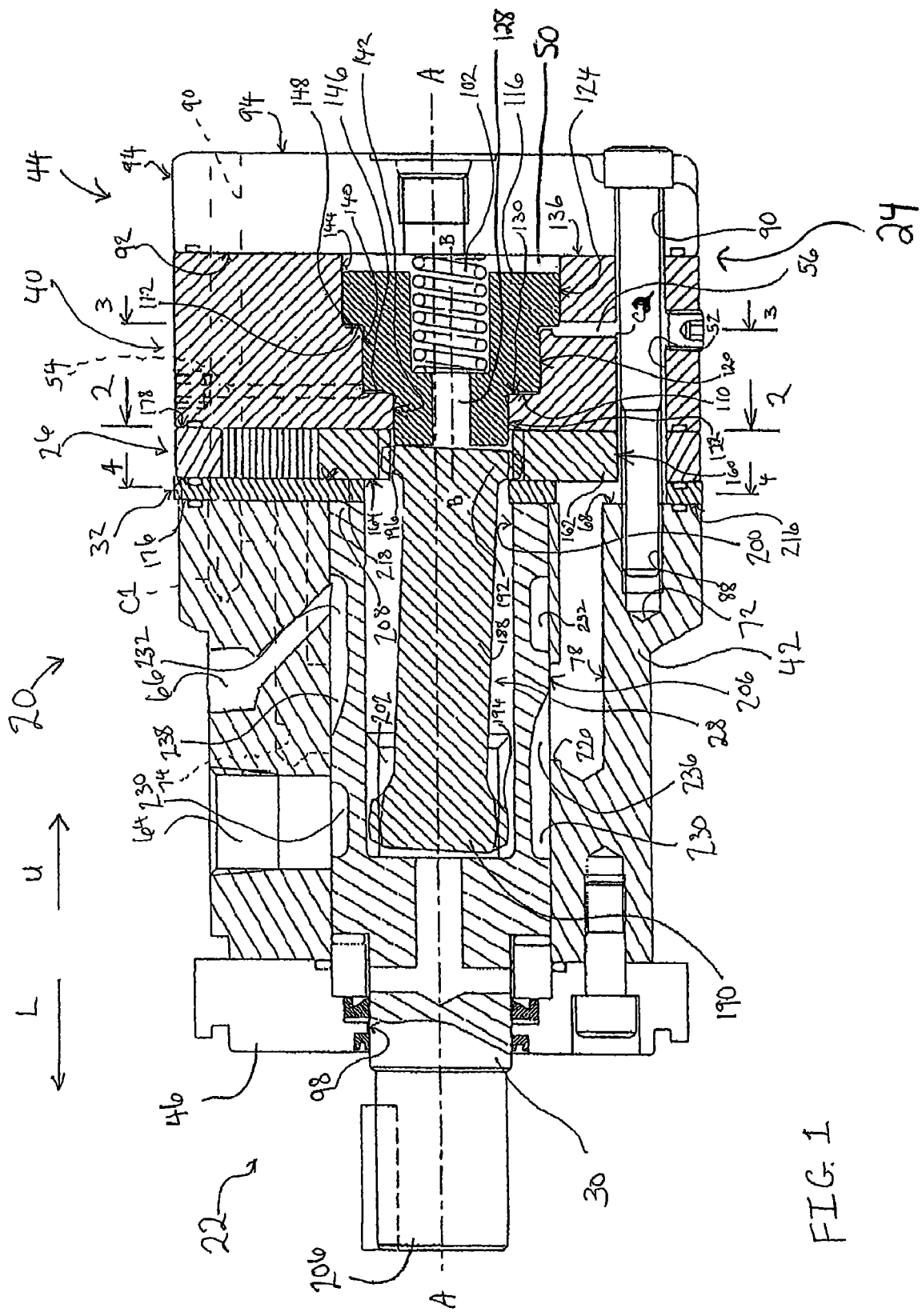
FIG. 1 is a partial sectional view of a gerotor motor, according to an embodiment.
Figure 2:
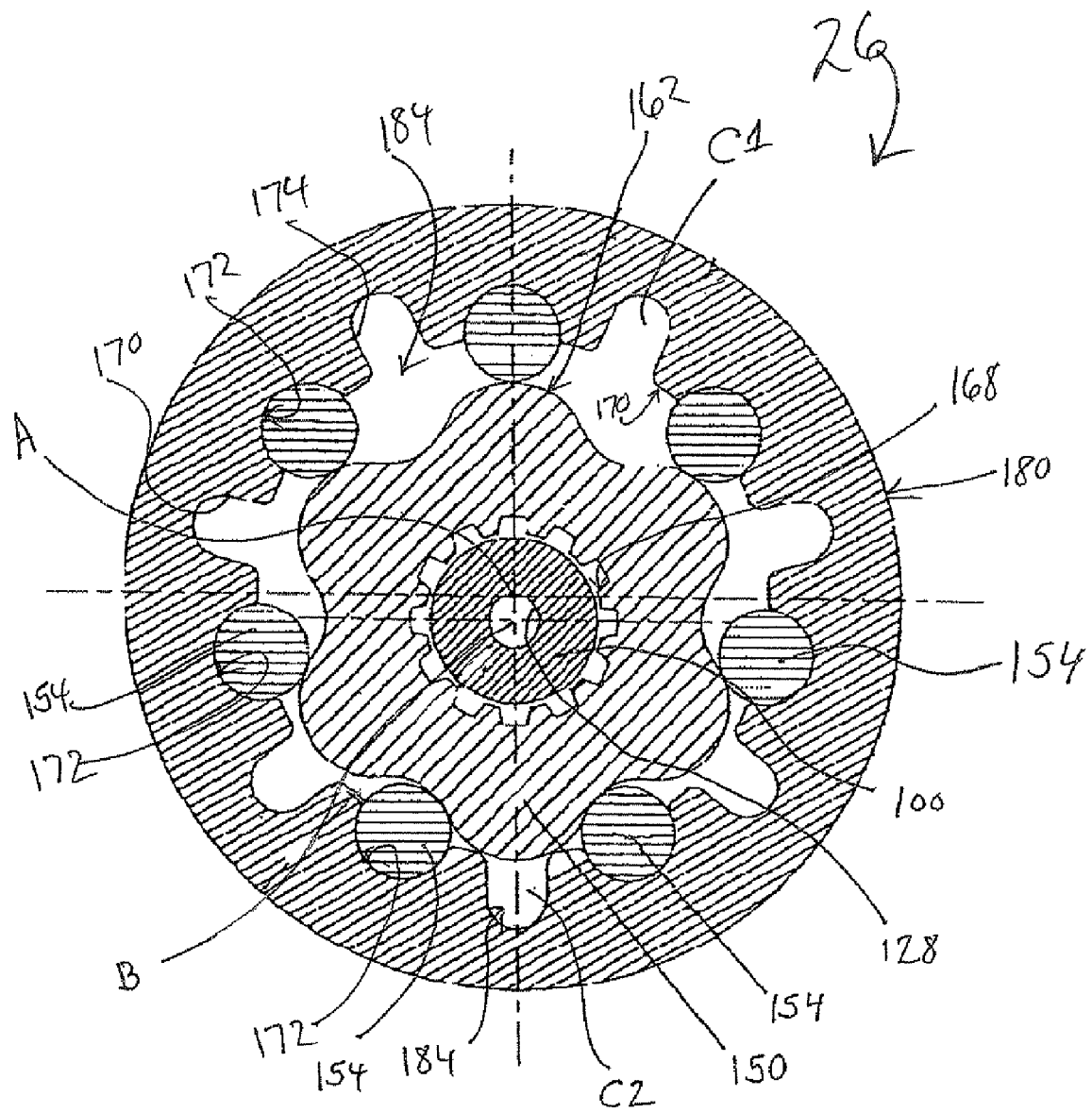
FIG. 2 is a sectional view of the motor of FIG. 1, taken generally along line 2-2 of FIG. 1.
Figure 3:
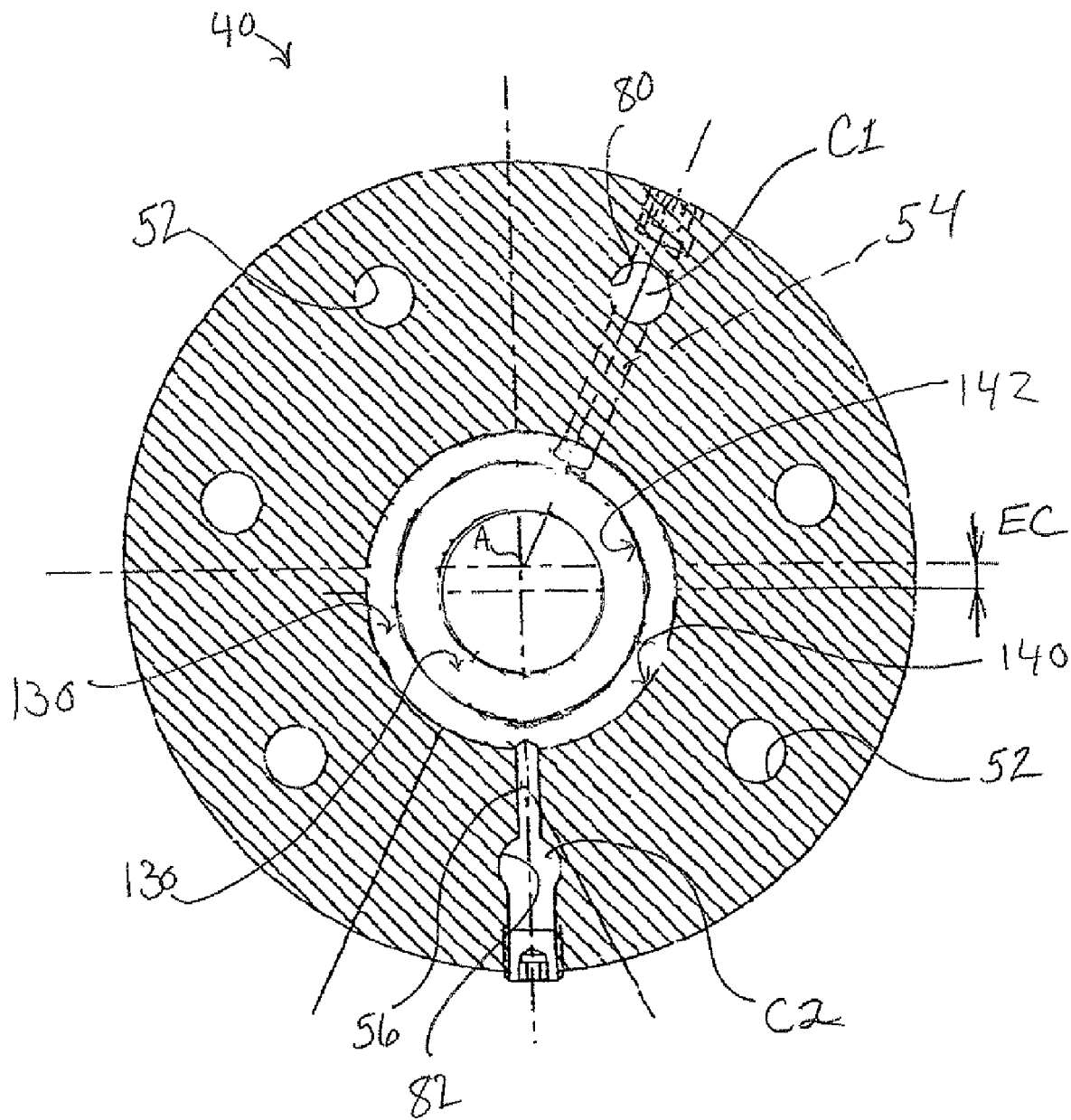
FIG. 3 is a sectional view of the motor of FIG. 1, taken generally along line 3-3 of FIG. 1.
Figure 4:
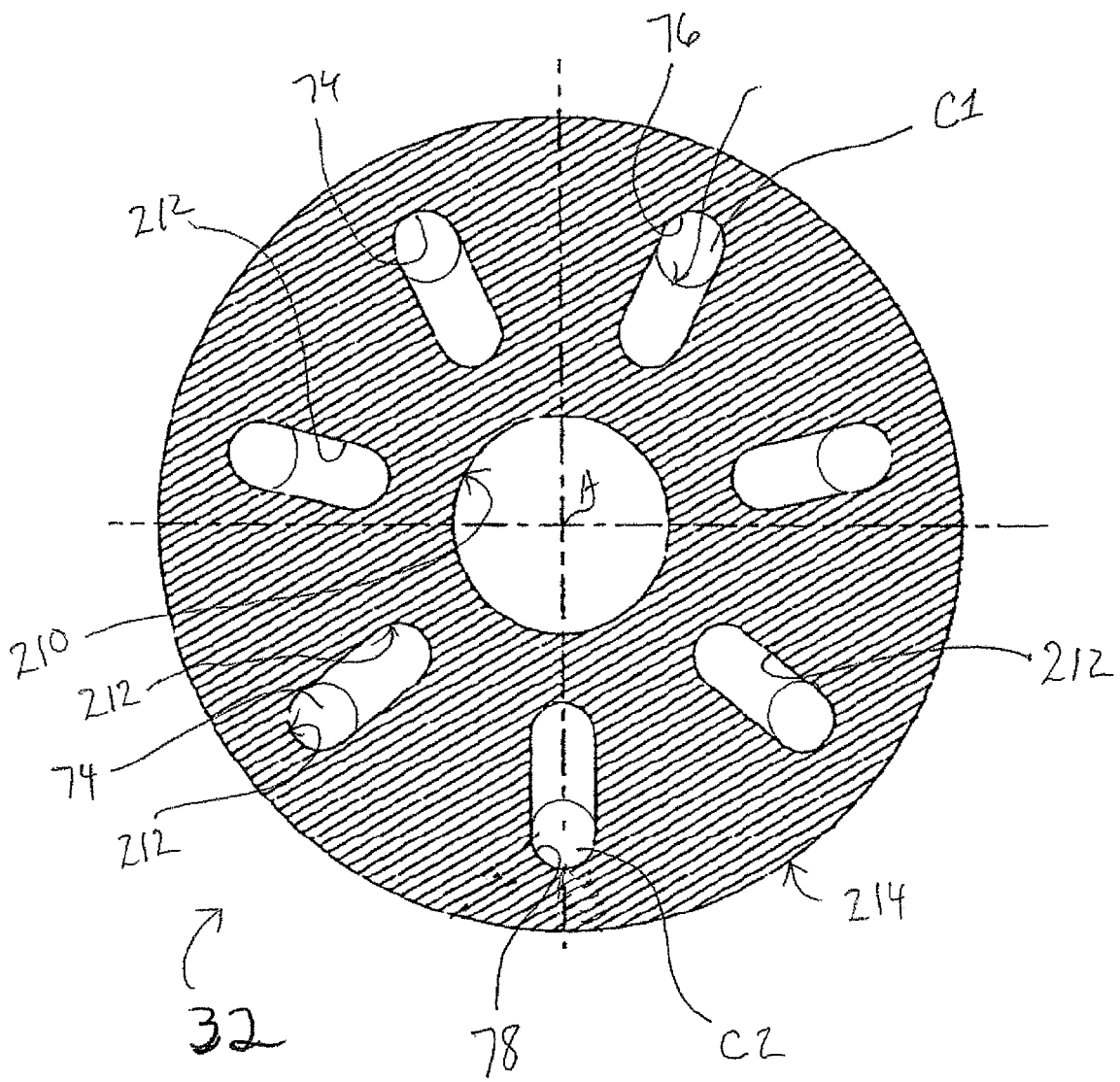
FIG. 4 is a sectional view of the motor of FIG. 1, taken generally along line 4-4 of FIG. 1.
Figure 5:
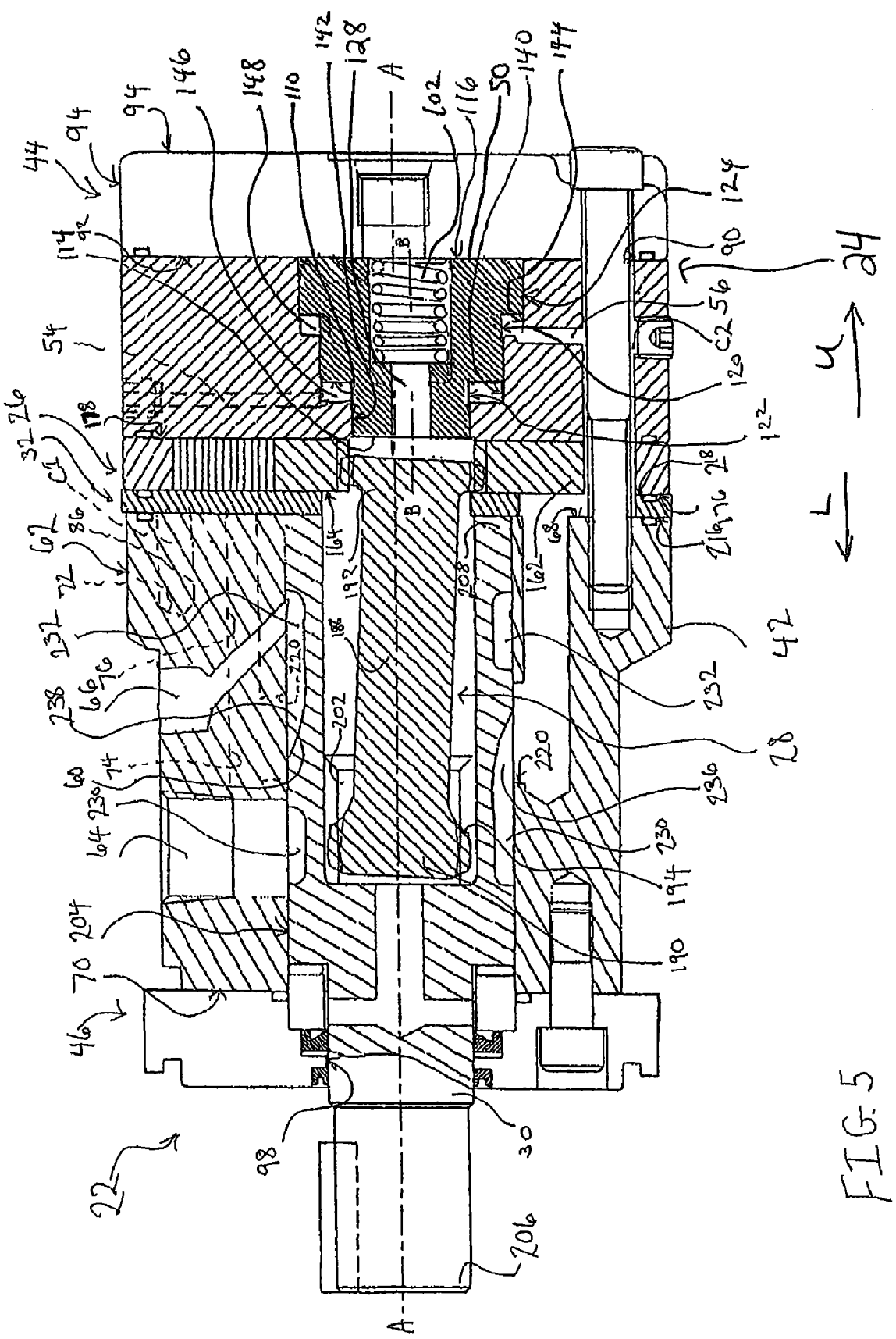
FIG. 5 is a partial sectional view of the gerotor motor of FIG. 1.

FIGS. 1-5 illustrate an embodiment of a gerotor motor 20. The motor 20 includes a housing 22, a brake/locking mechanism 24, a gerotor assembly 26, a drive 28, an output shaft 30, and a spacer 32. The housing 22 includes a first housing portion 40, a second housing portion 42, an endcap 44, and an output plate 46. As best seen in FIGS. 1 3, and 5, the first housing portion 40 has a brake pin aperture 50, a plurality of first fastening apertures 52, a first portion first radial channel 54, and a first portion second radial channel 56 formed therein. The second housing portion 42 includes a output shaft aperture 60, an outer surface 62, an inlet 64, an outlet 66, a spacer mating surface 68, an output end surface 70, a plurality of second fastening apertures 72 and a plurality of second portion channels 74 (also seen in FIG. 4).

The inlet 64 interconnects the output shaft aperture 60 and the outer surface 62. The outlet 66 interconnects the output shaft aperture 60 and the outer surface 62 and is not in fluid communication with the inlet 64. The outlet 66 does not intersect any second portion channel 74.

Of the second portion channels 74, as best seen in FIG. 4, one second portion channel 74 is identified as a second portion first channel 76, and another second portion channel 74 is identified as a second portion second channel 78. Of the first fastening apertures 52, as best seen in FIG. 3, one fastening aperture 52 is identified as a first portion first channel 80, and another fastening aperture 52 is identified as a first portion second channel 82. Of the second fastening apertures 72, as best seen in FIG. 1, one fastening aperture 72 is identified as a second portion first channel 86, and another fastening aperture 72 is identified as a second portion second channel 88.

The end cap 44 includes a plurality of fastener apertures 90, a first portion mating surface 92, and an end cap outer surface 94. The output plate 46 includes an output shaft aperture 98.

Referring to FIGS. 1 and 5, the mechanism 24 includes the first housing portion 40, the end cap 44, a brake pin 100, and a biasing member 102. In the embodiment illustrated, the brake pin 100 is defined, at least in part, by a first generally annular pin surface 110, a second generally annular pin surface 112, a third annular pin surface 114, a fourth annular pin surface 116, a first generally cylindrical pin surface 120 that interconnects the first generally annular pin surface 110 and the second annular pin surface 112, a second generally cylindrical pin surface 122 that interconnects the first generally annular pin surface 110 and the third annular pin surface 114, a third generally cylindrical pin surface 124 that interconnects the second annular pin surface 112 and the fourth annular pin surface 116, and a internal pin aperture 128.

The brake pin aperture 50 is defined, at least in part, by a first generally annular aperture surface 130, a second generally annular aperture surface 132, a first portion gerotor mating surface 134, a first portion end cap mating surface 136, a first generally cylindrical aperture surface 140 that interconnects the first annular aperture surface 130 and the second annular aperture surface 132, a second generally cylindrical aperture surface 142 that interconnects the first annular aperture surface 130 and the first portion gerotor mating surface 134, a third generally cylindrical aperture surface 144 that interconnects the second annular aperture surface 132 and the first portion end cap mating surface 136.

The brake pin 100 is interposed within the brake pin aperture 50 such that the second generally cylindrical pin surface 122 mates with the second generally cylindrical aperture surface 142, the first generally cylindrical pin surface 120 mates with the first generally cylindrical aperture surface 140, and the third generally cylindrical pin surface 124 mates with the third generally cylindrical aperture surface 144.

As best seen in FIGS. 1 and 5, the brake pin 100 is moveable within the brake pin aperture 50 to define a first generally annular brake chamber 146 and a second generally annular brake chamber 148. In the embodiment illustrated, the first chamber 146 is defined by the first generally annular pin surface 110, the second generally cylindrical pin surface 122, the first generally annular aperture surface 130, and the first aperture surface 140, and the second chamber 148 is defined by the second annular pin surface 112, the first generally cylindrical pin surface 120, the second generally annular aperture surface 132, and the third aperture surface 144.

The gerotor assembly 26, illustrated as a gerotor roller gear set in the embodiment of FIGS. 1, 2, and 5, includes a star 150 interposed within a ring 152, and a plurality of rollers 154. In the embodiment illustrated, the output shaft aperture 60 is a cylindrical aperture formed in the second housing portion 42 and defining an axis A-A (illustrated as point A in FIGS. 2 and 3), while the brake pin aperture 50 formed in the first housing portion 40 generally defines an axis B-B (illustrated as point B in FIG. 2).

As best seen in FIG. 2, the illustrative embodiment of the star 150 includes an outer surface 160 defining six lobes 162, a spacer mating surface 164, a first portion mating surface 166, and an internal splined star aperture 168. The ring 152 includes a ring internal surface 170 defined, at least in part, by seven roller surfaces 172 alternating with seven fastener recesses 174, a spacer mating surface 176, a first portion mating surface 178, and an outer surface 180.

Each roller surface 172 is in contact with one roller 154. The geometry of the assembly 26 is such that an expanding/contracting volume chamber 184 is defined by two adjacent rollers, a portion of the outer surface 160 of the star 150, and a portion of the ring internal surface 170 that includes one fastener recess 174. Briefly, operation of the assembly 26 includes the star 150 rotating within the ring 152 as point B revolves around point A generally in a circular path. As the star 150 rotates within the ring 152, each lobe 162 rotates into a position between two adjacent rollers 154 to decrease the volume of the respective volume chamber 184.

The drive 28, as best seen in FIGS. 1 and 5, includes an elongated body 188 having an output shaft mating end 190 and a star mating end 192. The output shaft mating end 190 is defined by a crowned splined surface 194, and the star mating end 192 is defined by a splined surface 196 that mates with the internally splined star aperture 168. The output shaft 30 includes the drive shaft aperture 200 partially defined by an output splined surface 202, an output portion 204 extending through the output shaft aperture 98 of the output plate 46, a contoured outer surface 206, and a spacer mating end 208. The spacer 32, as best seen in FIG. 4, includes a central opening 210, a plurality of fastener apertures 212, an outer surface 214, a spacer forward surface 216, and a spacer rearward surface 218.

The contoured outer surface 206 may be referred to as a spool valve. Each volume chamber 184 is in fluid communication with one fastener aperture 212 and one second portion channel 74. Each second portion channel 74 is in fluid communication with the output shaft aperture 60 via a passageway 220 where the output shaft aperture 60 includes a plurality of passageways 220 generally equally spaced about the circumference of the output shaft aperture 60.

The contoured outer surface 206 is defined by a generally annular inlet groove 230 in continuous fluid communication with the inlet 64. Similarly, the contoured outer surface 206 is defined by a generally annular outlet groove 232 which is in continuous fluid communication with the outlet 66. The contoured outer surface 206 is further defined by a plurality of axially extending slots 236 in fluid communication with the inlet groove 230, and a plurality of axial slots 238 in fluid communication with the outlet groove 232. The axial slots 236, 238 are also frequently referred to as feed slots or timing slots. As is generally well known to those skilled in the art, the axial slots 236 provide fluid communication between the inlet groove 230 and the passageways 220, while the axial slots 238 provide fluid communication between the outlet groove 232 and the passageways 220. In the illustrated embodiment, the contoured outer surface 206 includes seven generally equally spaced axial slots 236, and seven generally equally spaced axial slots 238 where the axial slots 236 do not intersect with the axial slots 238. As the output shaft 30 rotates, the axial slots 236, 238 alternate being in fluid communication with the passageways 220, as is known in the art.

To briefly describe the operation of the motor 20, as a fluid (not shown) flows into the inlet 64 the fluid will cause the star 150 to rotate before the fluid flows through the outlet 66. As the star 150 rotates within the ring 152, the drive 28 is rotated, which causes the output shaft 30 to rotate. The general operation of a hydraulic gerotor motor or pump will not be described herein since these operational principles are well known, as disclosed in commonly owned U.S. Pat. No. 6,062, 835, the disclosure of which is hereby incorporated by reference in its entirety.

A first channel C1 is defined by the second portion first channel 76 opening to the output shaft aperture 60 at one passageway 220, the second portion first channel 86, the first portion first channel 80, and the first portion first radial channel 54. Thus, the first channel C1 is in fluid communication with the first chamber 146 and in selective fluid communication with the inlet 64 a number of times as the output shaft 30 rotates one complete revolution.

A second channel C2 is defined by the second portion second channel 78 opening to the output shaft aperture 60 at one passageway 220, the second portion second channel 88, the first portion second channel 82, and the first portion second radial channel 56. Thus, the second channel C2 is in fluid communication with the second chamber 148 and in selective fluid communication with the inlet 64 a number of times as the output shaft 30 rotates one complete revolution.

In an embodiment of operating the mechanism 24, a pressurized fluid, such as oil, is forced into the inlet 64 and fills the inlet groove 230 and the axial slots 236 with the motor 20 in the locked configuration of FIG. 1. As best seen in FIG. 1, the second channel C2 is in fluid communication with the inlet 64 and the pressurized fluid is permitted to flow from the inlet 64 to the second chamber 148. The pressurized fluid in the second chamber 148 will urge the brake pin 100 toward the direction U of FIGS. 1 and 5 opposing a spring force exerted on the brake pin 100 by the biasing member 102 in the direction L. When the brake pin 100 has moved to the unlocked configuration of FIG. 5, the brake pin 100 is no longer interposed within the star aperture 168, and the star 150 is free to rotate and revolve about the axis A-A.

As the star 150 rotates within the ring 152, the inlet 64 is not always in fluid communication with the second chamber 148 via the second channel C2. When the inlet 64 is not in fluid communication with the second chamber 148, the first chamber 146 may be in fluid communication with the inlet 64 via the first channel C1 to permit a first fluid into the first channel C1 and thereby pressurize the first chamber 146 and retain the brake pin in the unlocked configuration of FIG. 5. Further rotation of the star 150 will result in the second chamber 148 again being in fluid communication with the inlet 64 to retain the brake pin in the unlocked configuration of FIG. 5.

To further describe an embodiment of operation of the motor 20, when the pressure of the fluid supplied to the inlet 64 is reduced, the rate of rotation of the star 150 will decrease and the fluid pressure within the chambers 146, 148 will reduce. When the pressure within the chambers 146, 148 is reduced sufficiently that the force on the brake pin 100 in the direction U will not resist the biasing force of the biasing member 102 in the direction L, the brake pin 100 will move in the direction L until the third annular pin surface 114 of the brake pin 100 contacts the first portion mating surface 166 of the star 150. Further rotation of the star 150 will result in the brake pin 100 aligning with the star aperture 168, as generally illustrated in FIG. 5. The biasing force of the biasing member 102 may then urge the brake pin 100 to move further in the direction L as a portion of the brake pin 100 is interposed within (engaged with) the star aperture 168, as generally illustrated in FIG. 1.

In the event that a motor, such as the motor 20 with six lobes 162, is in a rotational configuration where neither the first chamber 146 nor the second chamber 148 is in fluid communication with the inlet 64, the brake pin 100 will not align with the star aperture 168, and the motor will not lock. Prior to the brake pin 100 aligning with the star aperture 168, the first chamber 146 will be in fluid communication with the inlet 64, thus retaining the brake pin in the unlocked configuration of FIG. 5

A portion of the first fluid may comprise the second fluid, as the star 150 rotates and the channels 76, 78 permit fluid to enter into the channels 80, 82 due to differential pressures at the channels 76, 78. However, the fluid that enters the first channel C1 may never be the same fluid that enters the second channel C2.

An orifice or orifices may be positioned within the channel 54 and/or 56 to delay the locking of the brake pin 100 in order to prevent the brake pin 100 from contacting the star 150 during operation of the motor 20. Additionally, three brake chambers and channels may be formed in a motor, such as a motor 20 with a six-lobed star 150, where the three channels interconnect to three of the seven volume chambers 184 (but not three adjacent volume chambers 184) to maintain fluid communication between the inlet 64 and at least one brake chamber during all operational angles of the motor 20. Further, this type of brake pin may be used on non gerotor devices.

Although the steps of the method of operating the motor 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A gerotor apparatus comprising:
    a housing including a first member and a second member, wherein the first member includes a brake pin aperture formed therein, and the second member includes a second member aperture formed therein;
    a gerotor device interposed at least partially between the first member and the second member, wherein the gerotor includes a ring having a contoured inner surface defining a ring aperture and a star at least partially interposed within the ring aperture; and
    a brake pin at least partially interposed within the first member, wherein the brake pin includes a first annular surface and a second annular surface, the first annular surface defines, at least in part, a first brake chamber, the second annular surface defines, at least in part, a second brake chamber, a first fluid introduced into the first brake chamber will urge the brake pin in a first direction, and wherein a second fluid introduced into the second brake chamber will urge the brake pin generally in the first direction;
    wherein the first fluid is selectively directed toward the first brake chamber through a first channel formed in the first member, and wherein the second fluid is selectively directed toward the second brake chamber through a second channel formed in the first member, such that an input pressure is alternated between the first and second brake chambers during rotation of the star.

2. The apparatus of claim 1, further comprising an output shaft at least partially interposed within the second member aperture, wherein the output shaft rotates generally about an output shaft axis.

3. The apparatus of claim 2, further comprising a drive at least partially interposed within the star and the output shaft, wherein the drive is rotatably interconnecting to the output shaft for articulating movement therewith.

4. The apparatus of claim 1, further comprising a plurality of rollers in contact with the star.

5. The apparatus of claim 4, wherein the star, the ring, and the rollers cooperate to define a plurality of volume chambers that vary in volume between a minimum volume and a maximum volume during rotation of the star;
    wherein the first member defines a plurality of channels, each of the plurality of channels in communication with a different one of said volume chambers such that an input pressure is applied to the plurality of channels in an alternating fashion during rotation of the star such that the input pressure is applied to at least one of the volume chambers throughout each full revolution of the star.

6. The apparatus of claim 5, wherein the input pressure is varied amongst the plurality of channels during rotation of the star such that at least one of the channels defines a channel pressure less than the input pressure throughout each full revolution of the star.

7. The apparatus of claim 1, wherein at least a portion of the brake pin is selectively interposed within the star aperture to restrict rotation of the star.

8. The apparatus of claim 7, at least one orifice in fluid communication with at least one of the first brake chamber and the second brake chamber.

9. The apparatus of claim 1, wherein the brake pin includes a generally cylindrical first surface extending between the first annular surface and the second annular surface.

10. A method of operating a hydraulic motor comprising:
directing a first fluid into a first brake chamber to urge a brake pin in a first direction;
directing a second fluid into a second brake chamber to urge the brake pin in the first direction; and engaging the brake pin with a gerotor star to restrict the rotation of the star;
wherein the first fluid is selectively directed toward the first brake chamber through a first channel formed in the first member, and wherein the second fluid is selectively directed toward the second brake chamber through a second channel formed in the first member, such that an input pressure is alternated between the first and second brake chambers during rotation of the star.

11. The method of claim 10, wherein engaging the brake pin with the gerotor star includes urging the brake pin in a second direction, wherein the second direction is generally opposite the first direction.

12. The method of claim 11, wherein urging the brake pin in the second direction includes urging the brake pin in the second direction with a biasing member.

13. The method of claim 10, further comprising disengaging the brake pin from the gerotor star to permit rotation of the star.

14. The method of claim 10, wherein engaging the brake pin with the gerotor star includes interposing a portion of the brake pin into an aperture formed within the star.

15. The method of claim 14, further comprising moving the star to a position such that moving the brake pin will not result in the brake pin engaging the star aperture.

16. A gerotor apparatus comprising:
a housing including a first member and a second member, wherein the first member includes a brake pin aperture formed therein, and the second member includes a second member aperture formed therein;
a gerotor device interposed at least partially between the first member and the second member, wherein the gerotor includes a ring having a contoured inner surface defining a ring aperture and a star at least partially interposed within the ring aperture; and
a brake pin at least partially interposed within the first member, wherein the brake pin includes a first annular surface and a second annular surface, the first annular surface defines, at least in part, a first brake chamber, the second annular surface defines, at least in part, a second brake chamber, a first fluid introduced into the first brake chamber will urge the brake pin in a first direction, and wherein a second fluid introduced into the second brake chamber will urge the brake pin generally in the first direction;
wherein the first fluid is selectively directed toward the first brake chamber through a first channel formed in the first member, and wherein the second fluid is selectively directed toward the second brake chamber through a second channel formed in the first member, such that an input pressure is applied to the brake pin when the brake pin is aligned with a star aperture defined by the star;
and wherein the inlet pressure is not applied to the brake pin when the brake pin is not aligned with the star aperture.

* * * * *